United States Patent [19]

Murano

[11] Patent Number: 5,140,673
[45] Date of Patent: Aug. 18, 1992

[54] IMAGE FORMING APPARATUS

[75] Inventor: Shunji Murano, Aira, Japan

[73] Assignee: Kyocera Corporation, Kyoto, Japan

[21] Appl. No.: 714,204

[22] Filed: Jun. 12, 1991

[30] Foreign Application Priority Data

Jun. 16, 1990 [JP] Japan .................. 2-158393

[51] Int. Cl.$^5$ ............................. G06K 15/00
[52] U.S. Cl. .................. 395/108; 395/101; 346/154
[58] Field of Search ............... 395/108, 101; 340/782; 346/154, 107 R, 108, 107 A, 160

[56] References Cited

U.S. PATENT DOCUMENTS

| 3,517,258 | 6/1970 | Lynch | 315/169 |
| 3,740,570 | 6/1973 | Kaelin et al. | 307/40 |
| 4,554,637 | 11/1985 | Kuntze | 395/108 |
| 4,737,924 | 4/1988 | Miki | 395/108 |

FOREIGN PATENT DOCUMENTS 120751  4/1989  Japan .................. 395/108

*Primary Examiner*—Arthur G. Evans
*Attorney, Agent, or Firm*—Spensley Horn Jubas & Lubitz

[57] ABSTRACT

An optical printer head using LEDs, which is a form of image forming apparatus, comprises a plurality of arrays formed from a plurality of LEDs arranged in a straight line, the LEDs disposed symmetrically to each other in adjacent arrays being connected to respective individual signal lines formed in a cranked pattern extending from one array to the next, to supply printing data. Because the arranging order of the LEDs relative to the individual signal lines is reversed between adjacent arrays, prior art has required the provision of an external circuit for alternately reversing the arranging order of image data from one array to the next. On the other hand, according to the present invention, the optical printer head contains a hardware circuit configuration for reversing the arranging order of the input image data each time a signal generated for each array is supplied. As a result, the image data to be input to the optical printer head should only be supplied in accordance with the arranging order of the LEDs, and the arranging order of the thus input image data is changed accordingly in real time to drive the LEDs in the corresponding array. This serves to achieve the high speed driving of the optical printer head and the simplification of the circuit configuration.

2 Claims, 8 Drawing Sheets

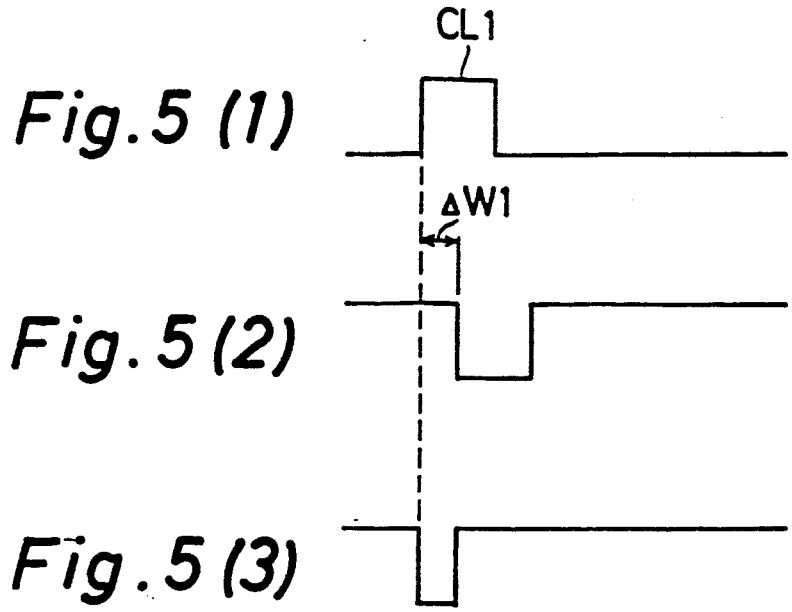
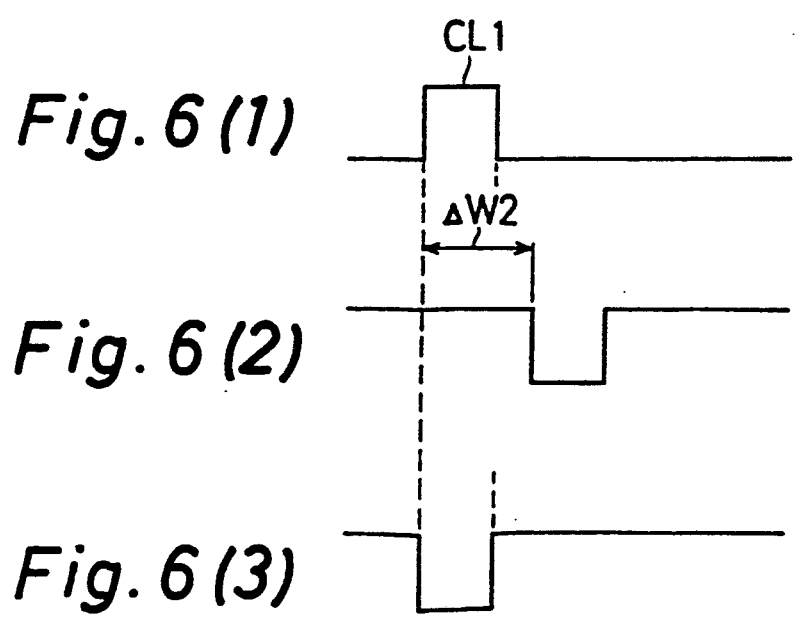

IMAGE FORMING APPARATUS

BACKGROUND OF THE INVENTION

1. Field of the Invention

The present invention relates to an image forming apparatus that can be embodied in relation to, for example, a light emitting diode (abbreviated as LED) head, a thermal head or the like.

2. Description of the Prior Art

It is known in prior art to provide a light emitting diode head comprising a pluraltiy of arrays each formed from a plurality of light emitting diodes arranged in a row, one terminal of each of the printing elements disposed symmetrically to each other in adjacent arrays being connected to an individual signal line in such a manner as to arrange the individual signal line in a zigzag pattern, the other terminal of each of the thus disposed light emitting diodes being connected to a common signal line provided for each array, thus forming a so-called dynamic drive matrix wiring pattern. At one end of the row of arrays, there is disposed a driving means which sequentially selects the common signal lines in the sequence of arrays and sequentially supplies power to the light emitting diodes contained in the selected array via the individual signal lines. The driving means selectively drives the light emitting diodes, as described above, with printing data to be recorded and individually corresponding to the light emitting diodes being given in the direction in which the light emitting diodes are arranged, i.e. from one end toward the other end of the array.

Such prior art is disclosed, for example, in U.S. Pat. No. 3,740,570, U.S. Pat. No. 3,517,258, and Japan Patent Publication No. 1-20751.

The above prior art requires that the printing data sequentially given to the printing elements along the arranged direction thereof be supplied to the individual signal lines with its sequence alternately reversed each time the data is transferred to each array; otherwise, the printing elements cannot be driven in sequence along the arranged direction thereof in accordance with the image data. The driving means temporarily stores the supplied image data in memory in order to transfer and sort the image data for each array, the data thus stored in memory being addressed in the forward or reverse direction to place them on the respective individual signal lines.

Therefore, the prior art requires the provision of a memory for the transfer and sorting of printing data for each array, which not only makes the construction complex and expensive but also requires a relatively long time for storing and sorting the printing data, thus imposing a limit to increasing the printing speed.

SUMMARY OF THE INVENTION

It is an object of the invention to provide an image forming apparatus which does not require the storing and sorting of printing data for printing elements such as light emitting diodes, thereby achieving a simplified construction as well as an increased printing speed.

Accordingly, the invention provides an image forming apparatus comprising:

printing means having a plurality of arrays each formed from a plurality of printing elements arranged in a straight line, the plurality of arrays being disposed adjacent to each other along the extending direction of the straight line, one terminal of each of the printing elements disposed symmetrically to each other in adjacent arrays being connected to an individual signal line and the other terminal thereof being connected to a common signal line provided for each array;

a plurality of memory elements provided individually corresponding to the plurality of printing elements in each array for supplying a store output to said one terminal of each printing element in order to set the terminal at a predetermined potential;

a data generating source for sequentially outputting printing data for the printing elements of the printing means in the sequence in which the printing elements are arranged;

a first switching element for supplying the output of one memory element to the input of the succeeding memory element while supplying the printing data from the data generating source to the input of the first stage memory element;

a second switching element for supplying the output of one memory element to the input of the preceding memory element while supplying the printing data from the data generating source to the input of the last stage memory;

means for sequentially setting the common signal lines for the respective arrays corresponding to the printing data generated from the data generating source at the other predetermined potential in the sequence in which the arrays are arranged;

a latch circuit interposed between the memory elements and the printing elements for latching the outputs of the memory elements in response to a latch signal and supplying the thus latched outputs to said one terminal of the printing elements;

a clock generating source for generating a clock signal synchronized with the printing data generated from the data generating source; and a signal generating circuit for generating a printing element array switching signal, a data transfer switching signal, and a latch signal in response to the clock signal, the switching signal being supplied to the first and second switching elements each time the data generating source generates printing data for one array, thereby alternately changing the data storing order in the memory elements from array to array and thus energizing the printing elements in the order that they are arranged, while generating the printing element array switching signal and the data transfer switching signal during the period between the completion of reading of all printing data for one array into the memory elements and the start of reading of the first printing data for the next array, the latch signal being generated for the printing data for each array and supplied in common to the latch circuit, thus causing the latch circuit to perform a latch operation.

The present invention is also characterized in that the latch circuit is so configured as to read and latch the printing data from the memory elements during the period in which the latch signal representing one of the logical values is supplied, and in that the signal generating circuit includes a counter for dividing the clock signal and producing a dividing output equal to the cycle of the printing data for one array; a first logic circuit for outputting, in response to the clock signal and each dividing output from the counter, the clock signal generated during the period between the completion of reading of all printing data for one array and the start of reading of the first printing data for the next array; a delay circuit for providing a delay time not longer than the cycle of the printing data in response to the clock signal from the first logic circuit; and a second logic circuit for generating a latch signal after logical processing in response to the clock signal from the first logic circuit and the delay output from the delay circuit.

According to the invention, the individual signal lines are each arranged in a zigzag pattern and connected to one terminal of each of the respective printing elements, such as light emitting diodes or heating resistors of a thermal heat, disposed symmetrically to each other in adjacent arrays, and printing data to be supplied to each printing element is sequentially output from the data generating source, the printing data thus output from the data generating source for the entire array being stored in a plurality of memory elements in the forward or reverse direction by the work of the memory elements, the first switching element, and the second switching element. By supplying the store output of each memory element to one terminal of each printing element thereby setting the terminal at a predetermined potential while setting the common line for the array corresponding to the printing data at the other predetermined potential in array sequential fashion, the printing elements can be energized sequentially along the arranged direction thereof in accordance with the printing data. This serves to simplify the construction as compared with the construction described in connection with the prior art which required temporarily storing printing data and reading out the thus stored data by alternately changing the addressing direction between forward and reverse in array sequential fashion. Also, since there is no need to sort the printing data, the printing speed can be increased. Moreover, it is not necessary to provide a pause between arrays for latching and data transfer operations, which helps to achieve a simplified construction and an increase in the printing speed.

In particular, according to the invention, the latch signal is generated from the signal generating circuit in such a way that the latch circuit is caused to perform a latch operation during the period between the completion of reading of all printing data for one array into the memory elements and the start of reading of the first printing data for the next array. Therefore, the printing data continuously transferred from the data generating source without breaks can be continuously read into the memory elements without any pause in the read operation of the memory elements, which helps to achieve a further increase in the printing speed.

According to the invention, the latch circuit reads and latches the printing data from the memory elements during the period in which the latch signal representing one of the logical values, for example, a low level, is issued, and holds the thus read data when the latch signal goes to the other logical value, for example, a high level; the counter contained in the signal generating circuit divides the clock signal and provides a dividing output equal to the cycle W1 of each clock of the printing data; the first logic circuit consisting of an AND gate, for example, outputs a signal CL1 in response to the clock signal and the dividing output of the counter during the period WCL1 between the completion of reading of all printing data for one array and the start of reading of the first printing data for the next array; the delay circuit gives the signal CL1 imposed from the first logic circuit a delay time not longer than the cycle WCL of the printing data; and the second logic circuit outputs a latch signal in response to the signal CL1 from the first logic circuit and the delayed output from the delay circuit, the latch signal thus having a pulse width not longer than the signal CL1 from the first logic circuit and therefore being transferred to the latch circuit to hold the printing data stored in the memory elements before the start of reading of the first printing data for the next array.

Also, according to the invention, since the clock signal generated from the clock generating circuit has the same cycle as that of the printing data generated for each printing element, printing can be performed in synchronism with the series of printing data continuously supplied without breaks, and for example, at high speed, from the data generating source. When the speed, i.e. the frequency, of the printing data supplied from the data generating source is constant, the clock frequency from the clock generating source is made to coincide with the frequency of the printing data from the data generating source, and the current or voltage for driving the printing data is adjusted so that a necessary light emission output or heat output can be obtained. On the other hand, when the speed, i.e. the frequency, of the printing data supplied from the data generating source is variable, the frequencies from the data generating source and the clock generating source should be adjusted so that the optimum light emission output or heat output for printing can be obtained, while keeping the current or voltage for driving the printing data at a constant value and making the frequency of the printing data to coincide with the frequency of the clock signal.

As described above, the invention provides a simple and inexpensive construction, while making it possible to increase the printing speed. Particularly, according to the invention, since the latch signal generated by the signal generating circuit is supplied in such a manner as to cause the latch circuit to perform a latch operation during the period between the completion of reading of all printing data for one array and the start of reading of the first printing data for the next array, the printing data continuously and serially supplied without breaks from the data generating source can be stored into the memory elements directly as data is supplied, causing no pause during the transfer operation to the memory elements and thus achieving a further increase in the printing speed.

Furthermore, according to the invention, the circuits contained in the signal generating circuit divide the clock signal and provide a dividing output equal to the cycle of the printing data for one array, the first logic circuit outputting the clock signal CL1 in response to the clock signal and the dividing output of the counter during the period between the completion of reading of all printing data for one array and the start of reading of the first printing data for the next array, the delay circuit giving the clock signal imposed from the first logic circuit a delay time not longer than the cycle of the printing data, and the second logic circuit outputting a latch signal in response to the clock signal from the first logic circuit and the delayed output from the delay circuit. As a result, the latch circuit latches and holds the printing data stored in the memory elements for one array before the first printing data for the next array is read, thus providing reliable prevention against malfunctioning.

BRIEF DESCRIPTION OF THE DRAWINGS

Other and further objects, features, and advantages of the invention will be more explicit from the following detailed description taken with reference to the drawings wherein:

FIGS. 5(1)–5(3) are diagrams showing waveforms to explain functions of a delay circuit 137 and an AND gate G70;

FIGS. 6(1)–6(3) are diagrams showing waveforms to explain other functions of the delay circuit 137 and the AND gate G70;

DETAILED DESCRIPTION OF THE PREFERRED EMBODIMENTS

Figure 1:
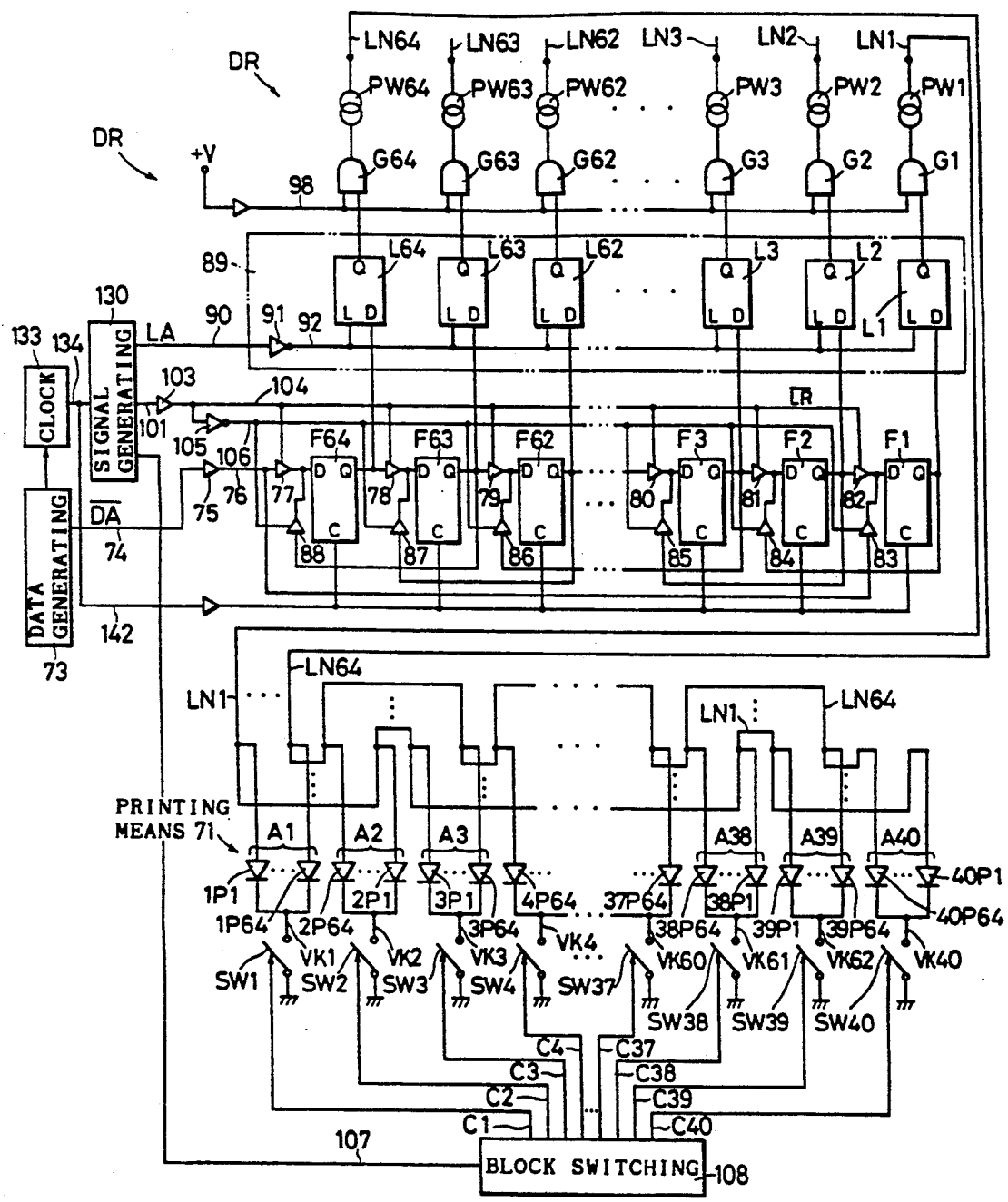
FIG. 1 is a block diagram of one embodiment of the invention.

Now referring to the drawing, preferred embodiments of the invention are described below.

FIG. 1 is a general block diagram of one embodiment of the invention. In the image forming apparatus of this embodiment, light emitting diodes 1p1–1p64, . . . , 40p1–40p64 contained in a printing means 71 are driven in dynamic manner in the order in which they are arranged and in the sequence of arrays from left to right in FIG. 1, thereby exposing a photosensitized material being transported in the direction (vertical direction in FIG. 1) perpendicular to the arranged direction (horizontal direction in FIG. 1) of the light emitting diodes to form an image thereon.

Figure 2:
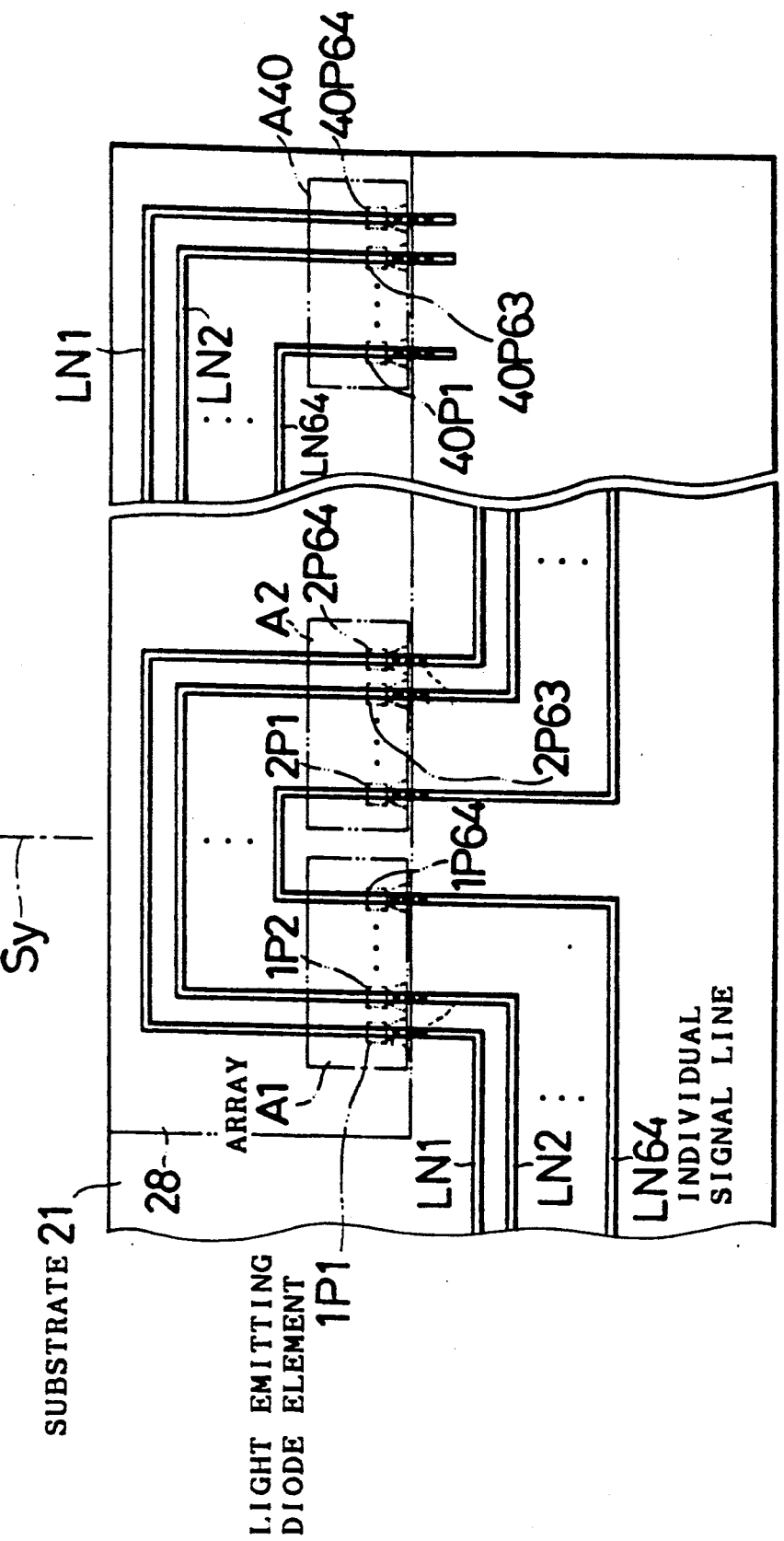
FIG. 2 is a simplified plan view showing the construction of a printing means 71.

FIG. 2 is a simplified plan view of the printing means 71. The light emitting diodes 1p1–1p64, . . . , 40p1–40p64 are arranged in arrays each consisting of a total of 64 light emitting diodes, the arrays being designated by the reference characters A1 to A40.

The arrays A1–A40 are respectively provided with common signal lines VK1–VK40 each serving as an electrode.

The substrate 21 of the printing means 71 is formed from an electrically insulating material such as a ceramic or glass, on the surface of which individual signal lines LN1–LN64 are formed in a zigzag or cranked pattern. The individual signal lines LN1–LN64 are each connected to one terminal of each of the light emitting diodes disposed symmetrically to each other in adjacent arrays, such pairs of light emitting diodes including, as shown in FIG. 2, 1p1/2p64 and 1p2/2p63 disposed symmetrically to each other in A1 and A2 with respect to the plane of symmetry Sy (see FIG. 2).

On the substrate 21, there is formed an electrically insulating layer 28 which partially covers the individual signal lines LN1–LN64 and on which the common signal lines VK1–VK40 (see FIG. 1) are formed. The other terminals of the light emitting diodes 1p1–1p64, . . . , 40p1–40p64 in the arrays A1–A40 are connected in common on an array-by-array basis to the respective common signal lines VK1–VK40.

The light emitting diode 1p2 and the individual signal line LN2 are interconnected by a bonding wire 33. The other light emitting diodes are also arranged in the same manner.

Referring back to FIG. 1, a driving means DR for driving the printing means 70 is provided on the substrate 21 and, based on sequential printing data supplied from a data generating source 73, the driving means DR drives the light emitting diodes 1p1–1p64; . . . ; 40p1–40p64 of the printing means 70 sequentially in the arranged direction thereof and in the sequence of the arrays A1 to A40, i.e. from left to right in FIG. 1.

The driving means DR includes D-type flip-flops F1–F64 which are storage elements individually corresponding to the light emitting diodes in each array A1–A20. Printing data $\overline{DA}$ supplied from the data generating source 73 via a line 74 is fed through a buffer 75 and a line 76 and is given to an input terminal of the first stage flip-flop F64 via a first switching element 77. An output Q of the flip-flop F64 is supplied to a first switching element 78 through which it is given to an input terminal of the flip-flop F63 at the next stage. The same goes with the other first switching elements 79–82.

The printing data supplied via the line 76 is also given to an input terminal of the last stage flip-flop F1 via a second switching element 83, the output Q of the last stage flip-flop F1 then being given to an input terminal of the flip-flop F2 at the preceding state via a second switching element 84. The same goes with the other second switching elements 85 to 88.

The outputs of the flip-flops F1–F64 are respectively given to the inputs of D-type flip-flops L1–L64 provided in a latch circuit 89. The flip-flops L1–L64 each perform a latch operation when a latch signal LA introduced from a signal generating circuit 130 to a line 90 is supplied through an inverting circuit 91 and via a line 92. The outputs of the flip-flops L1–L64 in the latch circuit 89 are each given to one terminal of each of AND gates G1–G64, and the outputs of the AND gates G1–G64 are respectively given to current sources PW1–PW64. The current sources PW1–PW64 apply current with the individual signal lines LN1–LN64 as one potential, thus supplying power to drive the light emitting diodes. A high level signal is constantly supplied to each of the AND gates G1–G64 via a line 98.

A switching signal output from the signal generating circuit 130 is delivered to a line 104 via a line 101 and a buffer 103 and is given to the first switching elements 77–82. The first switching elements 77–82 are caused to conduct when a high level signal is given via the line 104 and to shut off when a low level signal is given. The switching signal fed from the buffer 103 is inverted by an inverting circuit 105, and the thus inverted signal is given via a line 106 as the other switching signal to the second switching elements 83–88. The second switching elements 83–88 are caused to conduct when the inverted switching signal fed via the line 106 is high and to shut off when the signal is low.

The light emitting diodes in the arrays A1–A40 are respectively connected on an array-by-array basis to switches SW1–SW40 via the respective common signal lines VK1–VK40, the switches SW1–SW40 being connected to the ground potential. A shift clock signal is output from the signal generating circuit 130 and is given to an array switching circuit 108 via a line 107. The array switching circuit 108 supplies an array switching signal to the switches SW1-SW40 via lines C1-C40 in response to the shift clock signal, to sequentially activate the switches SW1-SW40 for the arrays A1-A40 one at a time.

Figure 3:
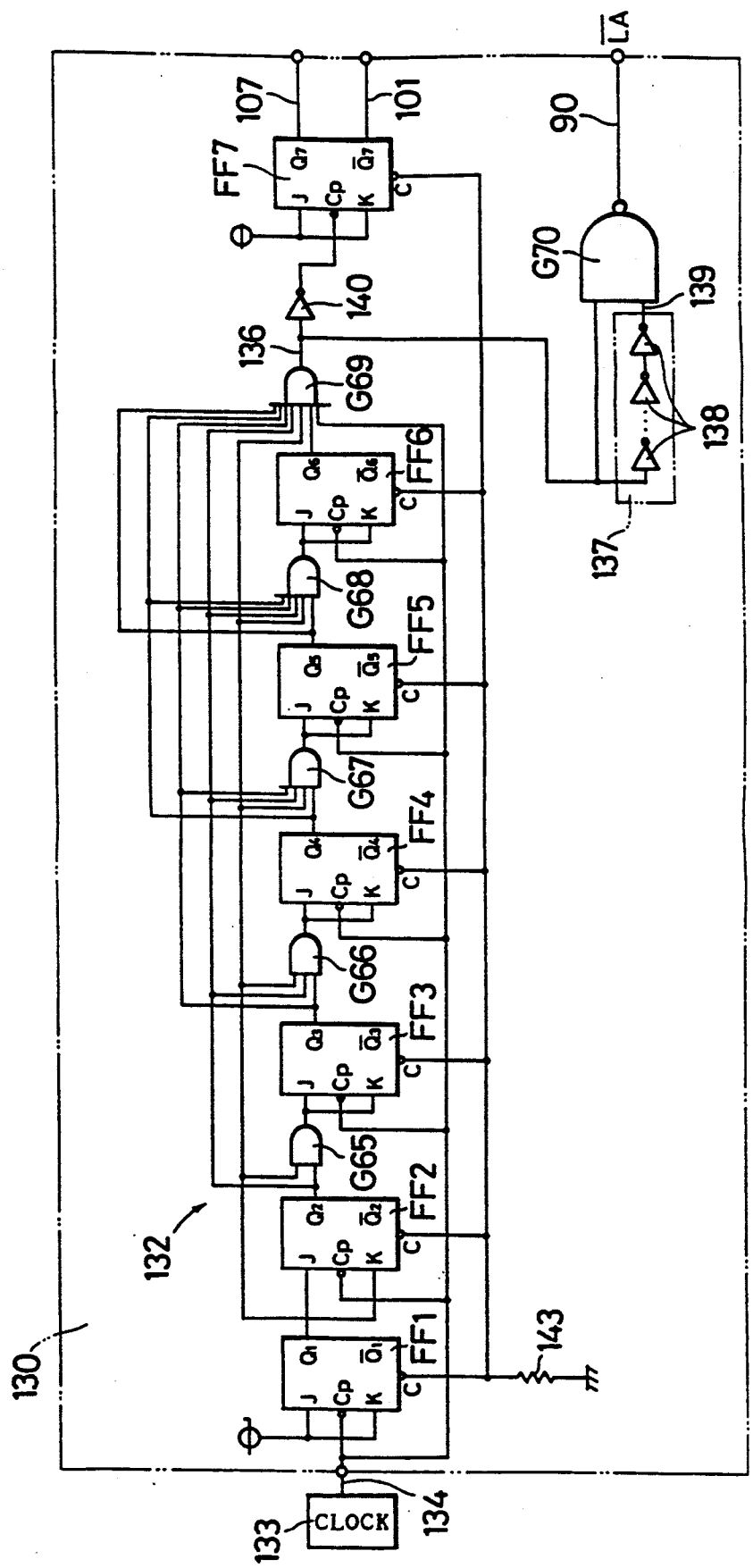
FIG. 3 is a block diagram showing the detailed configuration of a signal generating circuit 130.

FIG. 3 is a block diagram showing the detailed configuration of the signal generating circuit 130. The signal generating circuit 130 has a counter 132 which comprises flip-flops FF1-FF6 and AND gates G65-G68. A clock signal is given from a clock generating source 133 to an input terminal Cp of the first stage flip-flop FF1 via a line 134. When input terminals J and K of the flip-flop FF1 are both at a high level, the output changes state at every falling edge of the input terminal Cp. The other flip-flops FF2-FF6 each have the same configuration as the flip-flop FF1. Interposed between the flip-flops FF2 and FF3 is the AND gate G65 to which the output Q2 of the flip-flop FF2 and the output Q1 of the preceding flip-flop FF1 are given, while the output of the AND gate G65 is given to input terminals J and K of the succeeding flip-flop FF3. The configuration of each of the remaining AND gates G66-G68 is analogous to that of the AND gate G65.

Figure 4:
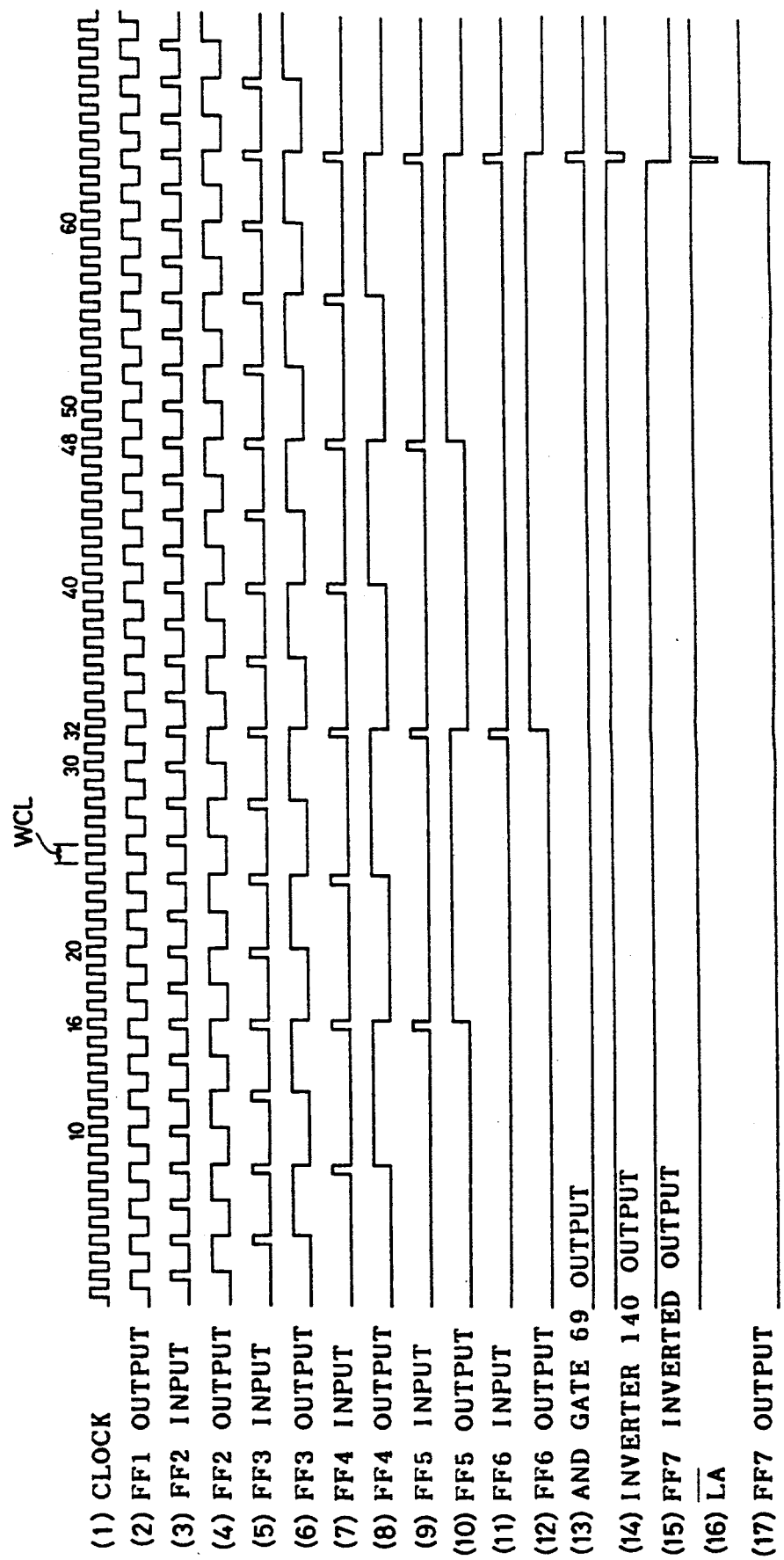
FIG. 4 is a diagram showing waveforms to explain the operation of the signal generating circuit 130.

FIG. 4 shows waveforms explaining the operation of the signal generating circuit 130 shown in FIG. 3. The clock signal shown in FIG. 4(1) is applied from the clock generating source 133 to the line 134. The output Q1 of the flip-flop FF1 has the waveform shown in FIG. 4(2). The output Q1 of the flip-flop FF1 is given to the input terminals J and K of the flip-flop FF2, while the clock signal is applied to the input terminal Cp thereof. As a result, a signal as shown in FIG. 4(3) is input to the flip-flop FF2, and thus the waveform shown in FIG. 4(4) is obtained at the output Q2 of the flip-flop FF2. Likewise, a pulse signal as shown in FIG. 4(5) is input to the flip-flop FF3, and the waveform shown in FIG. 4(6) appears at the output Q3 of the flip-flop FF3. Further, a pulse signal as shown in FIG. 4(7) is input to the flip-flop FF4, thereby obtaining the waveform of FIG. 4(8) at the output Q4 of the flip-flop FF4. A pulse signal as shown in FIG. 4(9) is input to the flip-flop FF5, as a result of which a waveform as shown in FIG. 4(10) appears at the output Q5 of the flip-flop FF5. A pulse signal as shown in FIG. 4(11) is input to the flip-flop FF6, as a result of which a waveform as shown in FIG. 4(12) is obtained at the output Q6 of the flip-flop FF6. In FIG. 4, the reference numerals 1-64 which designates the waveform of the clock signal correspond to the respective light emitting diodes in each array A1-A40. Thus, the output Q6 of the flip-flop FF5 is obtained by dividing the clock signal and has the cycle equal to that of the printing data for each array A1-A40.

The AND gate G69, which serves as a first logic circuit, outputs a clock signal CL1 of a waveform shown in FIG. 4(13) to a line 136 in response to the clock signal from the clock generating source 133 supplied via the line 134 and the outputs Q1-Q6 of the flip-flops FF1-FF6 that constitute the counter. The clock signal CL1 is generated during the period between the completion of reading of all printing data for one array into the flip-flops F1-F64 and the start of reading of the first printing data for the next array into the flip-flops F1-F64.

The clock signal CL1 output from the AND gate G69 to the line 136 is given to a delay circuit 137. The delay circuit 137 is constructed using an odd number of inverting circuits 138 connected in series or cascade.

A NAND gate G70, which serves as a second logic circuit, is supplied with the clock signal CL1 output from the AND gate G69 via the line 136 and the delay output derived from the delay circuit 137 via a line 139.

Now referring to FIG. 5, functions of the delay circuit 137 and the NAND gate G70 are described. When the clock signal CL1 shown in FIG. 5(1) is output from the AND gate G69 to the line 136 and a pulse delayed by the delay circuit 137 by time $\Delta W1$, as shown in FIG. 5(2), is supplied to the line 139, a latch signal $\overline{LA}$ as shown in FIG. 5(3) is output from the NAND gate G70 to a line 90. The delay time $\Delta W1$ is set to a value smaller than the cycle of each printing data, i.e. the cycle WCL of the clock signal (see FIG. 4(1)), for example, to 60 to 100 nsec.

Accordingly, even if the delay circuit 137 malfunctions, the latch signal $\overline{LA}$ output from the NAND gate G70 to the line 90 is low for a period at maximum equal to the high level period of the clock signal CL1 and will not stay low for a longer time than that period. For example, even when the clock signal CL1 shown in FIG. 6(1) is output from the AND gate G69 to the line 136 and a pulse having a relatively large time delay of $\Delta W2$ is introduced, the latch signal $\overline{LA}$ output from the NAND gate G70 to the line 90 has, at maximum, a low level period equal to the high level period of the clock signal CL1, and there is no possibility that a latch signal having a longer low level period is output. Each latch circuit flip-flop L1-L64 derives the signal supplied to its data input terminal D directly at its output terminal Q during the low level period of the latch signal $\overline{LA}$ applied via the line 90, and when the latch signal $\overline{LA}$ on the line 90 goes high, latches the data input terminal D at the moment the latch signal goes high, and derives and holds the data at the output terminal Q. In this embodiment of the invention, since the latch signal $\overline{LA}$ is low for a period not longer than the high level period of the clock signal CL1, the low level latch signal is obtained during the period between the completion of reading of all printing data for one cycle into the flip-flops F1-F64 and the start of reading of the first printing data for the next array into the flip-flops F1-F64, thereby allowing the printing data for each array to be held in the latch circuit 89 and thus preventing malfunctioning.

The latch signal $\overline{LA}$ supplied via the line 90 is shown in FIG. 4(16).

Referring back to FIG. 3, the output of the AND gate G69 introduced to the line 136 is inverted through the inverting circuit 140 to produce an inverted output the waveform of which is shown in FIG. 4(14). The output of the inverting circuit 140 is given to an input terminal Cp of a flip-flop FF7, while the remaining input terminals J and K of the flip-flop FF7 are held at a high level. Therefore, the array switching signal delivered from an output Q7 of the flip-flop FF7 to a line 107 has a waveform, as shown in FIG. 4(17), alternating between a high and a low level from array to array. The other output $\overline{Q7}$ of the flip-flop FF7 has a waveform as shown in FIG. 4(15) and is supplied, via a line 101, as a signal for switching the transferring direction of the printing data. The array switching circuit 108 sequentially activates the switches SW1-SW40 in the sequence of arrays in response to the array switching signal applied via the line 107.

The speed of frequency at which the printing data is supplied from the data generating source 73 to the line 70 is constant. In synchronism with the output of the data generating source 73, the clock generating source 133 supplies a clock signal, synchronized with the printing data and having the same cycle WCL, to the line 134, as previously described, while supplying the clock signal to the clock input terminal of each flip-flop F1-F64 via a line 142.

Referring to FIG. 3, when power is turned on, a clear signal, i.e. a rising waveform, is given to the clear input terminal C of each flip-flop FF1-FF7 by the work of a resistor 143, to perform a clear operation.

When the frequency of the printing data supplied from the data generating source 73 is fixed, it is possible to adjust the light emission output of each light emitting diode 1p1-40p64 by suitably setting the value of the current derived from the current source PW1-PW64. Voltage sources capable of varying the voltage may be used instead of the current sources PW1-PW64.

Figure 7:
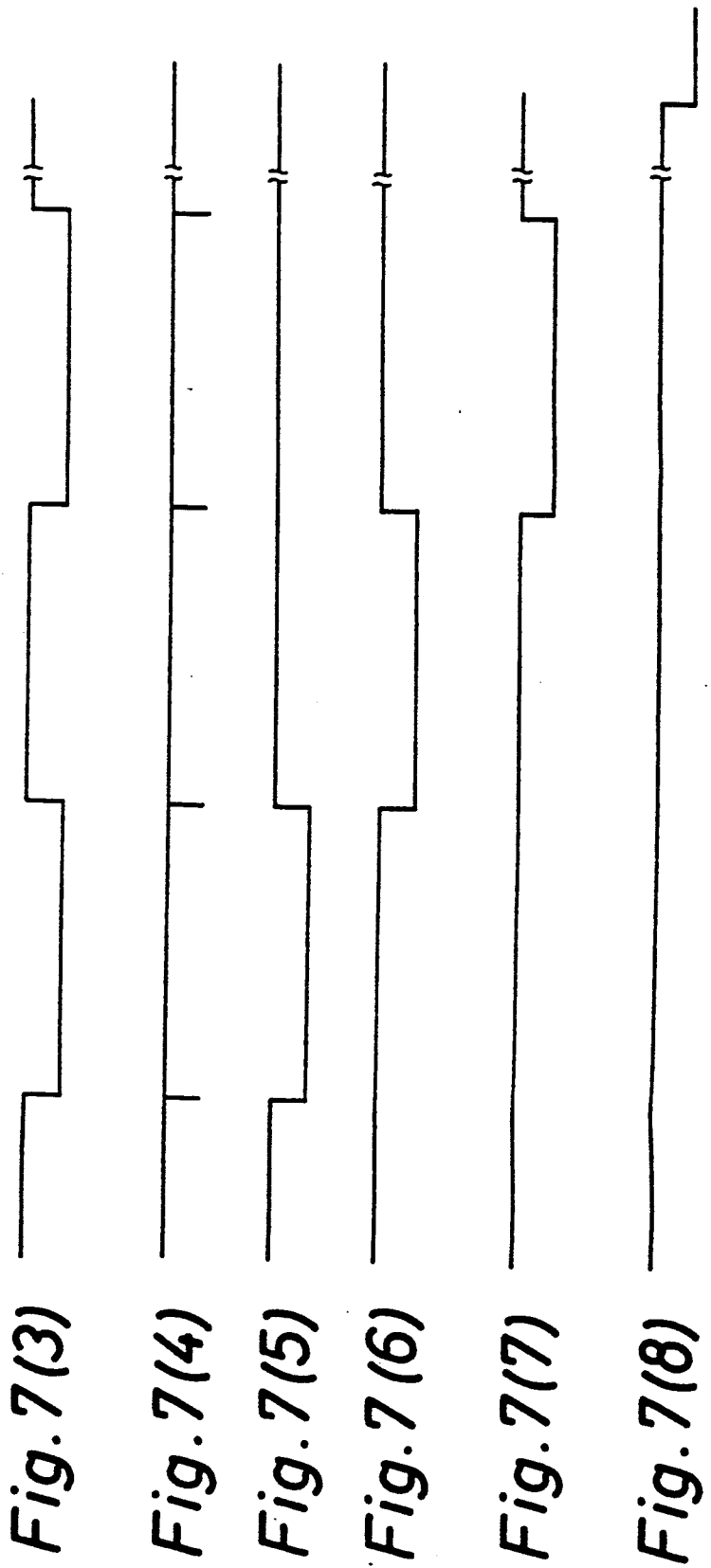
FIGS. 7(1)–7(8) are diagrams showing waveforms to explain the operation of the image forming apparatus shown in FIG. 1.

Referring to FIG. 7, the operation of the image forming apparatus shown in FIG. 1 is now described. A clock signal as shown in FIG. 7(1) is output from the clock generating source 133 to the line 134. In synchronism with the clock signal, the data generating source 73 supplies printing data to the line 74, as shown in FIG. 7(2). In FIG. 7(2), the reference numerals 1-64 indicate the printing data individually corresponding to the light emitting diodes 1p1-1p64, 2p1-2p64, . . . , 40p1-40p64 provided in the arrays A1-A40. The signal generating circuit 130 supplies a data transfer direction switching signal shown in FIG. 7(3) to the line 101. In response to the switching signal delivered to the line 101, the printing data is transferred in forward or reverse direction to the flip-flops F1-F64 and is stored therein continuously without breaks. A latch signal as shown in FIG. 7(4) is output from the signal generating circuit 130 to the line 90. Even when the printing data is supplied continuously without breaks as described, the latch signal is generated during the period between the completion of reading of all data for one array and the start of reading of the first printing data for the next array so that the printing data for one array is simultaneously stored and latched in the latch circuit 89. The array switching circuit 108 applies waveforms as shown in FIG. 7(5)-FIG. 7(8) to the lines C1, C2, C3, C40. During the low period of the respective waveforms, the corresponding switches SW1, SW2, SW3, SW40 are activated to energize the light emitting diodes in the respective arrays.

Figure 8:
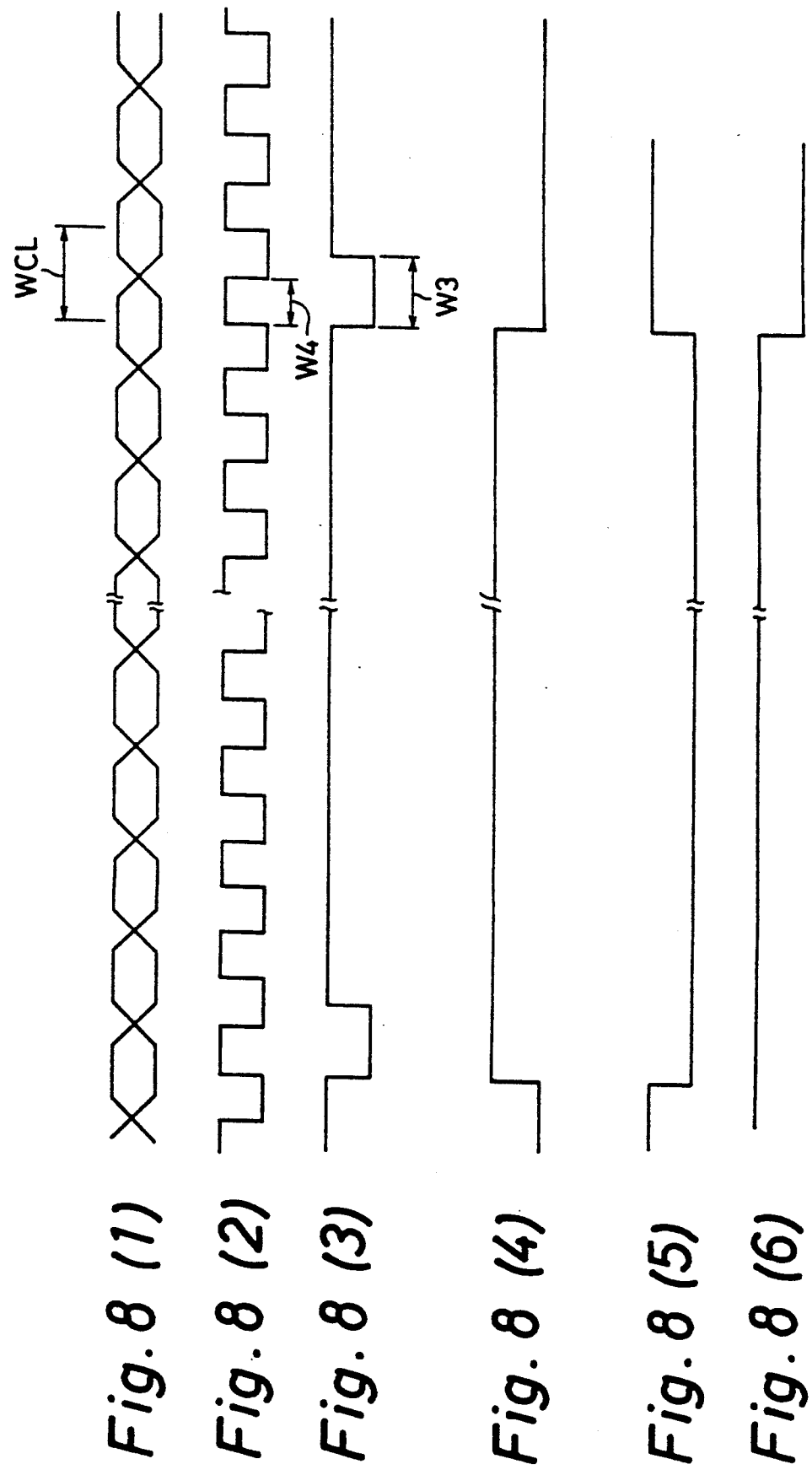
FIGS. 8(1)–8(6) are diagrams showing waveforms with a magnified time base to explain the operation of the image forming apparatus shown in FIG. 1.

FIG. 8 is a diagram showing waveforms with the time base greatly magnified as compared with those shown in FIG. 7, to explain the operation of the image forming apparatus shown in FIG. 1. The printing data, as shown in FIG. 8(1), is generated for each array A1-A40 in synchronism with the clock signal, as shown in FIG. 8(2), while the latch signal $\overline{LA}$ is generated as shown in FIG. 8(3). The low level period W3 of the latch signal $\overline{LA}$ is not longer than the high level period W4 of the clock signal CL1 output from the AND gate G69 to the line 136 in FIG. 3, and shorter than the cycle WCL of the printing data and clock signal (W3≦W4<WCL). This provides reliable prevention of data transfer failure of the latch circuit 89. The data transfer switching signal transmitted via the line 101 has a waveform as shown in FIG. 8(4). The array switching circuit 108 applies the waveforms shown in FIG. 8(5) and FIG. 8(6) to the lines C1 and C2 to active the switches SW1 and SW2 in sequence.

Figure 9:
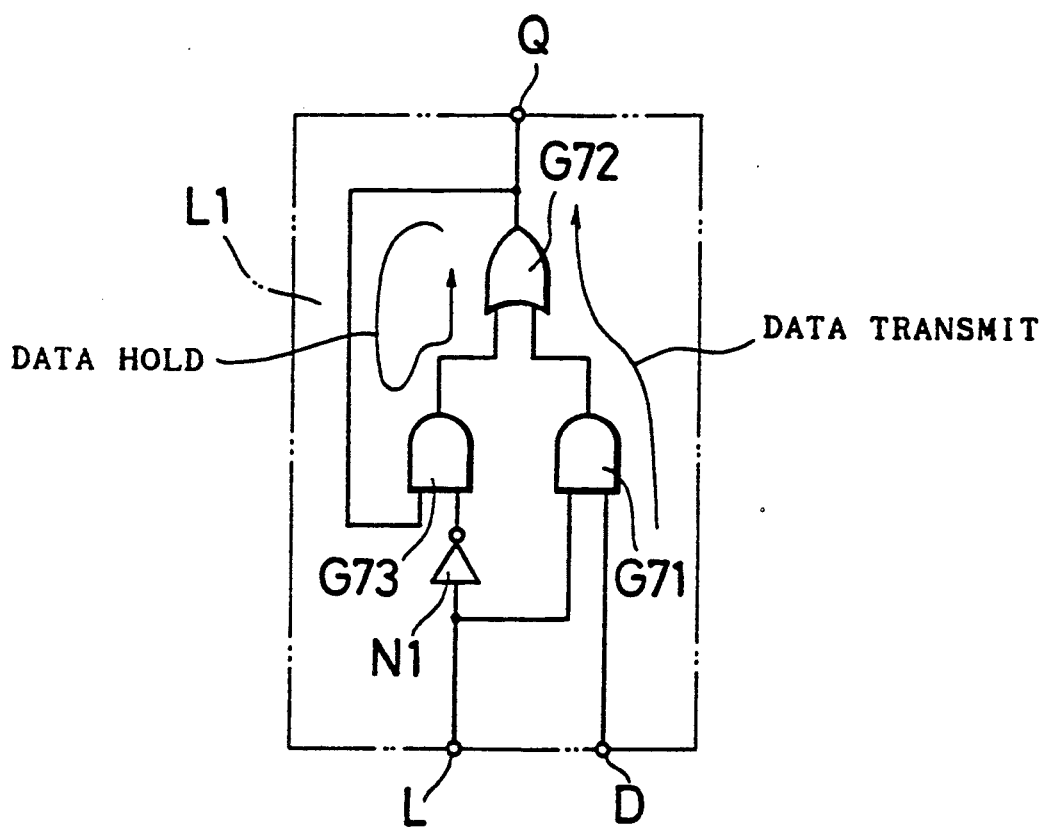
FIG. 9 is a block diagram showing the detailed configuration of a D-type flip-flop L1 forming part of a latch circuit 89.

The D-type flip-flop L1 that constitutes part of the latch circuit 89 has a configuration such as shown in FIG. 9. The D-type flip-flop L1 consists of an AND gate G71 to which the signals from the input terminals D and L are given, an OR gate G72 to which the output of the AND gate G71 is given, an AND gate G73 to which the output of the OR gate G72 is given, and an inverting circuit N1 which inverts the signal from the terminal L and gives the inverted signal to the AND gate G73. The output of the OR gate G72 is derived at the output terminal Q.

The thus configured D-type flip-flop L1 operates as shown in Table 1.

TABLE 1

| Input terminal D | Input terminal L | Output terminal Q |
|---|---|---|
| Low level | Low level | Low level |
| High level | Low level | High level |
| X | High level | Q0 |

In Table 1, x indicates that the state is independent of the image data supplied at the input terminal D and that when the input terminal L is high, the output terminal is Q0, meaning that the first image data given to the input terminal D is latched and held.

When the latch signal $\overline{LA}$ on the line 90 is low and therefore a high level signal is given to the input terminal L via the line 92, the printing data supplied to the input terminal D is passed through the AND gate G71 and the OR gate G72 and is derived at the output terminal Q, thus transferring the data. When the input terminal L is low, that is, when the latch signal $\overline{LA}$ on the line 90 is high, the AND gate G73 and the OR gate G72 work so as to latch and hold the printing data.

In the above embodiment, the speed or frequency at which the printing data is generated from the data generating source is fixed, and in synchronism with the frequency of the printing data, the clock signal generating source 133 generates a clock signal synchronized with the printing data, in accordance with which the current sources PW1-PW64 are adjusted so as to obtain optimum printing quality. However, in another embodiment of the invention, when the speed or frequency of the printing data generated from the data generating source 73 is variable, the frequency of the printing data from the data generating source 73 and the frequency of the clock signal generated by the clock signal generating source 133 in synchronism with the printing data should be varied, while holding the current supplied from the current sources PW1-PW64 at constant value, so that the optimum printing quality can be obtained. For example, when the frequency of one line formed by a total of 40 arrays A1-A40 is denoted as W0, the frequency WCL of the printing data and thus the clock signal is as shown in equation (1), and the frequency W1 for one array is as shown in equation (2). Voltage sources may be used instead of the current sources.

$$WCL = W0/(64 \times 40) \quad (1)$$

$$W1 = WCL \times 64 \quad (2)$$

The invention is applicable not only to image forming apparatus using light emitting diodes but to image forming apparatus employing thermal heads formed from heating resistance elements, instead of light emitting diodes. The invention may also be embodied using printing elements of other configuration than stated above.

The invention may be embodied in other specific forms without departing from the spirit or essence characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus comprising:
   a printing means having a plurality of arrays each formed from a plurality of printing elements arranged in a straight line, the plurality of arrays being disposed adjacent to each other along the extending direction of the straight line, one terminal of each of the printing elements disposed symmetrically to each other in adjacent arrays being connected to an individual signal line and the other terminal thereof being connected to a common signal line provided for each array;
   a plurality of memory elements provided individually corresponding to the plurality of printing elements in each array for supplying a store output to said one terminal of each printing element in order to set the terminal at a predetermined potential;
   a data generating source for sequentially outputting printing data for the printing elements of the printing means in the sequence in which the printing elements are arranged;
   a first switching element for supplying the output of one memory element to the input of the succeeding memory element while supplying the printing data from the data generating source to the input of the first stage memory element;
   a second switching element for supplying the output of one memory element to the input of the preceding memory element while supplying the printing data from the data generating source to the input of the last stage memory;
   potential switching means for sequentially setting the common signal lines for the respective arrays corresponding to the printing data generated from the data generating source at the other predetermined potential in the sequence in which the arrays are arranged;
   a latch circuit interposed between the memory elements and the printing elements for latching the outputs of the memory elements in response to a latch signal and supplying the thus latched outputs to said one terminal of the printing elements;
   a clock generating source for generating a clock signal synchronized with the printing data generated from the data generating source; and
   a signal generating circuit for generating a printing element array switching signal, a data transfer switching signal, and a latch signal in response to the clock signal, the switching signal being supplied to the first and second switching elements each time the data generating source generates printing data for one array, thereby alternately changing the data storing order in the memory elements from array to array and thus energizing the printing elements in the order that they are arranged, while generating the printing element array switching signal and the data transfer switching signal during the period between the completion of reading of all printing data for one array into the memory elements and the start of reading of the first printing data for the next array, the latch signal being generated for the printing data for each array and supplied in common to the latch circuit, thus causing the latch circuit to perform a latch operation.

2. An image forming apparatus as set forth in claim 1, wherein:
   the latch circuit is so configured as to read and latch the printing data from the memory elements during the period in which the latch signal representing one of the logical values is supplied; and
   the signal generating circuit includes:
   a counter for dividing the clock signal and producing a dividing output equal to the cycle of the printing data for one array;
   a first logic circuit for outputting, in response to the clock signal and each dividing output from the counter, the clock signal generated during the period between the completion of reading of all printing data for one array and the start of reading of the first printing data for the next array;
   a delay circuit for providing a delay time not longer than the cycle of the printing data in response to the clock signal from the first logic circuit; and
   a second logic circuit for generating a latch signal after logical processing in response to the clock signal from the first logic circuit and the delay output from the delay circuit.

* * * * *